Dec. 31, 1957 M. E. McCLELLAN 2,817,945
FLAIL TYPE PICK-UP AND BALER ASSEMBLY
Filed Dec. 2, 1955
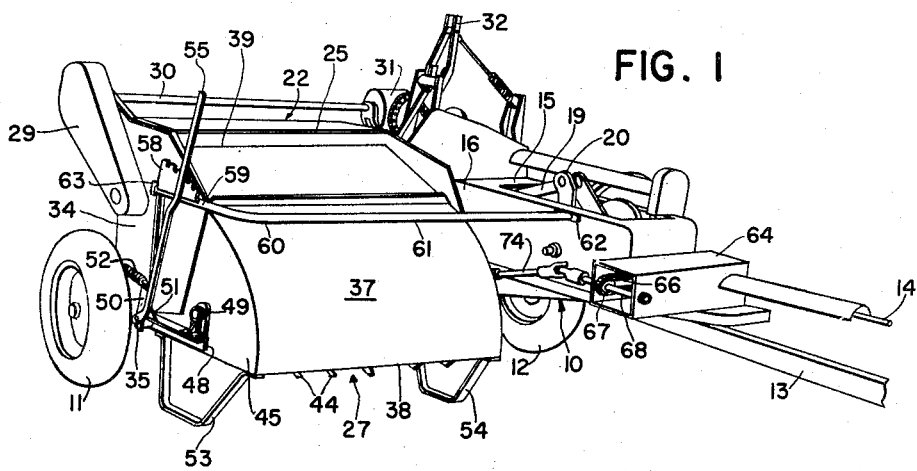
*INVENTOR.*
M. E. McCLELLAN

United States Patent Office 2,817,945
Patented Dec. 31, 1957

2,817,945

FLAIL TYPE PICK-UP AND BALER ASSEMBLY

Marcus E. McClellan, Ottumwa, Iowa, assignor to Deere Manufacturing Co., Dubuque, Iowa, a corporation of Iowa Application December 2, 1955, Serial No. 550,645

10 Claims. (Cl. 56—341)

This invention relates to an agricultural machine and more particularly to an improved machine comprising the novel combination of a baling machine and crop-collecting means of the rotary chopper type.

A typical baler of the so-called in-line type comprises a mobile main frame in which the bale case is parallel to the line of advance and material is fed to the bale case by a transverse conveyor leading to a feed opening in the adjacent upright fore-and-aft side wall of the bale case, crops being picked up from the field and delivered to the conveyor by a conventional type of pick-up means. According to the present invention, a crop-collecting means of the rotary chopper type, such as that in the U. S. Patent to Lundell, 2,758,435, is substituted for the pick-up means and is mounted on the baler ahead of the conveyor in a novel manner so that the chopper operates to finely reduce the crops as they are severed or picked up from the field, the rotary chopper including a rearwardly extending roof or hood under which the crops are delivered rearwardly in a sweeping action for delivery to the auger. The auger then conveys the crops to the baling mechanism in the bale case, the crops being baled in the conventional manner. However, the feature of the bales is that the crops are finely reduced rather than being substantially long as in the conventional baler and pick-up means. It is an object of the invention to provide a design in which a rotary chopper of the character disclosed may be simply and easily mounted on a baler of existing construction without material alterations in the nature of the over-all machine. The invention further features novel supporting and driving means for the rotary chopper, together with additional features and objects that will appear as the disclosure is developed in connection with the accompanying sheet of drawings, the several figures of which will be described immediately below.

Fig. 1 is a perspective of the machine.
Fig. 2 is a plan view of the machine.
Fig. 3 is a section on the line 3—3 of Fig. 2.
Fig. 4 is an enlarged fragmentary view as seen on the line 4—4 of Fig. 2.
Fig. 5 is an enlarged fragmentary section as seen on the line 5—5 of Fig. 2.

The basic machine comprises a mobile main frame 10 carried by right and left hand wheels 11 and 12, respectively, for advance over a field of crops under the propelling power of a tractor (not shown) to which the machine is connected by means of a forwardly extending draft tongue 13 and from which power is derived by the machine via a conventional propeller shaft 14.

The machine is of the so-called in-line type and therefore has a bale case 15 parallel to the line of advance and having an inner upright fore-and-aft side wall 16 in which is formed a feed inlet opening 17 (Fig. 3). The bale case contains typical baling mechanism, including a plunger 18 (a portion of which is visible in Fig. 2), a plunger pitman 19 and a driving crank 20. This mechanism operates in the usual manner to compress and bale crops fed thereto through the feed opening 17, the bale being discharged at the rear end 21 of the bale case 15.

The main frame also carries a laterally outwardly extending feed trough 22 which is elongated in a direction transverse to the line of advance. This feed trough includes a floor 23, an upright transverse rear wall 24 and a top wall 25. The floor or bottom 23 has a forward or leading edge 26 disposed at a convenient level above the ground. The feed trough is therefore open at its front for the receipt of crops from crop-collecting means or a crop-collector designated in its entirety by the numeral 27. These crops are fed to the feed trough and in the feed trough is a conveyor, here in the form of an auger 28, operative to move the crops laterally inwardly into the feed opening 17, the auger being substantially in lateral alinement with the feed opening. The auger is of the type driven at its outer or right hand end by drive mechanism contained within a shield 29 (Figs. 1 and 2), to which mechanism power is supplied by a transverse shaft 30 from other mechanism 31 that drives an overhead feeder 32 and tying mechanism, generally indicated by the numeral 33, for tying the bales as they are formed. The construction shown here is typical of many conventional balers and could be varied at will without departure from the principles of the present invention. The feed trough 22 has at its outer end upright terminal end structure 34 which, because of the length of the feed trough and of the auger 28, is laterally outwardly remote from the side wall 16 of the bale case 15. This end structure supports the auger 28 as well as the driving mechanism contained within the shield 29, which construction may be considered here as typical of that shown in the U. S. patent to Crumb, 2,450,082.

The main frame, here the bottom of the trough 22, carries a pair of transversely spaced apart coaxial trunnions 35 (Figs. 1 and 4) and 36 (Fig. 3) for mounting the crop-collector 27. The trunnions therefore afford a transverse horizontal axis below the level of the feed trough floor 23 and about which the crop-collector 27 is vertically adjustable relative to the feed trough and bale case, the details of which will presently appear.

The crop-collector 27 includes housing structure comprising a roof 37 of arched nature, having its length transverse to the line of travel and including a forward or leading edge 38 and a rearward or trailing edge 39. As to the latter, the roof is so constructed that the rear portion thereof extends rearwardly and upwardly in vertically spaced relation to the front edge 26 of the floor 23 of the feed trough and further in such manner that the edge 39 and the top wall 25 of the feed trough are in overlapping relation. The vertical spacing between the front edge 26 of the feed trough and the rear edge 39 of the roof 37 affords a material transfer or discharge opening 40 through which crops are delivered to the feed trough by a rotor 41 as it rotates in the direction of the arrow 42 (Fig. 3). The rotor is of the type having its axis transverse to the line of advance, which axis is afforded by a rotor shaft 43 from which a plurality of flail-like elements or arms 44 radiate to serve the crop-collecting function. As indicated by the arrow 42, the rotor operates in such manner as to sweep downwardly and forwardly through the open bottom of the housing structure or collector 27, thus moving in the same direction as the machine to sever and lift crops from the field, and thence moving upwardly and rearwardly to carry these crops upwardly and rearwardly and beneath the roof 37 for discharge to the auger 28 in the feed trough 22. Because of the nature of the rotor, which operates like that of the above-mentioned Lundell patent, the crops, whether severed directly from the field or whether picked up after having been previously harvested, are relatively finely reduced before they are transferred to the auger 28. Hence, when the crops are delivered to the bale case for baling by the bale mechanism 18—19—20, the result will be different from the conventional bale, in which the material being baled is of relatively long length.

The crop-collector has right and left hand end walls 45 and 46 which close the structure from the ends, together with a transverse upright rear wall portion 47 which adds rigidity to the structure and which facilitates mounting of the collector 27 on the coaxial trunnions 35 and 36. In addition, each of the end walls carries a fore-and-aft structural member in the form of an angle 48, only that for the right hand end wall being clearly visible, but it will be understood that a similar arrangement is provided at the opposite end. The angles 48 serve as means for carrying the necessary bearings, as at 49, for the rotor shaft 43 and in addition are mounted at their rear ends on the respective trunnions 35, 36. As shown in Fig. 4, the angle 48 forms one arm of a bell crank, the other of which is formed by an upstanding arm 50. The two arms 48 and 50 are interconnected by a gusset 51. An assist or balance spring 52 is connected at its forward end to an upper portion of the arm 50 and is appropriately connected in any suitable manner (not shown) at its rear end to the upright terminal end structure 34. A similar spring arrangement may be provided at the other end of the collector 27. Depending from the end walls 45 and 46 of the collector 27 are, respectively, U-shaped runners 53 and 54 which serve in conventional manner as gauge means, guards and means for supporting the collector 27 when detached from the baler, it being understood that the trunnions are readily disconnectible to provide for ready attachment and detachment of the collector.

A control lever 55 is loose at its lower end on the trunnion 35 and extends upwardly therefrom alongside the arm 50. The lever has thereon a lug 56 for engagement with the front edge of the lever 50 to achieve a one-way connection whereby the collector 27 is free to float vertically relative to the rest of the machine about the trunnions 35 and 36, but the lever 55 is effective to raise the collector to a transport position or to otherwise adjust the position of the collector by cooperation with releasable means in the form of a notched sector 58 carried on the fore-and-aft leg 59 of an L-shaped support 60 which has in addition a transverse leg 61. The inner end of the leg 61 is rigidly secured at 62 to the wall 16 of the bale case 15 and the rear end of the fore-and-aft leg 59 is rigidly secured at 63 to the feed trough, preferably via the terminal end structure 34. The L-shaped support 60 not only serves as a support for the sector 58 but also re-enforces the connection between the feed trough and the bale case. The L-shaped support is clear of the collector 27, the transverse leg 61 being spaced above and free from the roof 37 and the fore-and-aft leg 59 running alongside of but free from the end wall of the structure 27.

The propeller shaft 14 serves as means for supplying driving power to what may be considered power input means 64 at the forward end of the bale case. As best shown in Fig. 2, the rear end of the propeller shaft 14 has keyed thereto a driving sprocket 65 from which drive is transmitted via a chain 66 to a driven sprocket 67. The sprocket 67 is keyed to a rearwardly extending shaft 68 which is in fore-and-aft alinement with a driven shaft 69 that projects forwardly from a gear case 70. This gear case is mounted on the left hand side wall 46 of the collector structure 27 (Fig. 5). The gear casing contains appropriate gearing (not shown) by means of which the shaft 69 drives a sheave 71, which sheave is connected by a belt 72 to a sheave 73 keyed to the left hand end of the rotor shaft 43. A flexible and telescopic drive shaft means 74 interconnects the alined shafts 68 and 69, so that the propeller shaft and the associated drive mechanism furnishes power for driving the rotor 41. Since the gear case 70 is carried by the collector 27, the collector may have up and down movement about the axis of the trunnions 35 and 36, which movement is accommodated by telescoping of the shaft means 74. The left hand wall 46 is spaced laterally outwardly from the proximate wall 16 of the bale case 15 and the gear case and drive mechanism are accommodated in this space. The means for mounting the gear case may comprise any suitable bracket, such as that shown at 75 in Fig. 5.

In operation, the machine is drawn over the field by any conventional agricultural tractor having a typical power take-off shaft, which shaft is connected to the propeller shaft 14 for furnishing power to the baling mechanism as well as to the rotor 41. If crops are standing in the field, the flail-like arms 44 of the rotor will harvest these crops and pick them up to sweep them rearwardly to the auger 28 via the material-transfer opening 40 in the manner previously described. The floating action of the structure 27, afforded by the trunnions 35 and 36, enables the structure to accommodate itself to varying terrain. The lever 55 serves as means for effecting a downward limit on movement of the structure 27 as well as means for raising the structure 27 to a transport position. If crops have been previously harvested by some other means and the machine is subsequently drawn over such field, the previously harvested corps will be picked up by the rotor 41 and delivered to the auger 28 in the manner previously described, which is another example of the versatility of the machine. As previously indicated, the structure 27 may be readily detached from the machine and replaced by a conventional baler pick up if desired.

Others features of the invention not categorically enumerated herein will undobutedly occur to those versed in the art, as will many modifications and alterations in the preferred embodiment shown, all of which may be achieved without departure from the spirit and scope of the invention.

What is claimed is:

1. An agricultural machine adapted to advance over a field of crops, comprising: a mobile main frame including a fore-and-aft bale case and baling mechanism therein, said bale case having an upright side wall provided with a feed opening; a feed trough carried by the main frame and extending laterally outwardly from and in communication with said feed opening, said feed trough having a transverse front edge portion and an outer upright terminal end structure spaced laterally outwardly from said upright wall; an open-bottom crop-collector housing structure disposed ahead of the feed trough and having an arched roof formed about an axis parallel to the feed trough, said roof having a forward transverse edge spaced above the ground but below the level of the feed trough and a rearward transverse edge spaced above and overlying the front edge of the feed trough to define a crop-transfer opening, and said housing structure having opposite inner and outer fore-and-aft end walls respectively adjacent to the bale case wall and the feed trough terminal end structure; means supporting the housing structure on the main frame; a crop-collecting rotor carried in the housing for rotation on an axis parallel to and horizontally intermediate the front edges of the feed trough and roof and at a level vertically intermediate said front edges, said rotor having a central shaft and a plurality of flail-like elements connected to and radiating from the shaft, said rotor being rotatable to cause the elements to sweep downwardly through the open bottom of the housing structure and then forwardly to collect crops from the field and then upwardly and rearwardly to lift the collected crops to carry the crops rearwardly beneath the roof and to cause the crops to depart from the rotor rearwardly through the aforesaid crop-transfer opening and onto the feed trough; and conveyor means carried in the feed trough and operative to move the crops laterally inwardly through the feed opening and into the bale case.

2. The invention defined in claim 1, including: power input means at a fore part of the bale case; a shaft extension on the rotor shaft, projecting laterally inwardly at the inner wall of the crop-collector housing; and drive-transmitting means interconnecting the power input means and the shaft extension.

3. The invention defined in claim 2, in which: the inner wall of said housing structure is spaced laterally outwardly from the upright wall of the bale case; and the drive-transmitting means includes a gear casing mounted in the space between said two walls.

4. The invention defined in claim 1, in which: the means supporting the housing structure on the main frame includes trunnion means providing for vertical swinging adjustment of the housing structure relative to the feed trough about a transverse axis, and releasable means for selectively setting any one of several adjusted positions of said housing structure.

5. The invention defined in claim 1, in which: the means supporting the housing structure on the main frame includes trunnion means providing for vertical swinging adjustment of the housing structure relative to the feed trough about a transverse axis; an L-shaped support having a transverse leg and a fore-and-aft leg, said transverse leg extending across the front of and free from the housing structure and having an inner end secured to the bale case, and said fore-and-aft leg extending rearwardly from the transverse leg and laterally outwardly of and free from the housing structure end wall and having a rear end secured to the feed trough; an adjusting lever connected to the housing structure to adjust said housing structure about the axis of said trunnion means, said lever extending upwardly adjacent to the aforesaid fore-and-aft leg; and means releasably cooperative between the lever and said fore-and-aft leg for securing and releasing the lever to respectively fix and adjust the position of the housing structure.

6. The invention defined in claim 1, in which: the conveyor means is an auger having its axis generally parallel to the front edge of the feed trough; and the rear portion of the roof of the housing structure projects rearwardly to dispose its rear edge over the auger.

7. The invention defined in claim 6, in which: the feed trough includes an upright transverse rear wall behind the auger and a transverse top wall extending forwardly from said rear wall and into overlapping relation to said rear portion of the roof of the housing structure.

8. An agricultural machine adapted to advance over a field of crops, comprising: a mobile main frame including a fore-and-aft bale case and baling mechanism therein, said bale case having an upright side wall provided with a feed opening; a feed trough carried by the main frame and extending laterally outwardly from and in communication with said feed opening, said feed trough having a transverse front edge portion and an outer upright terminal end structure spaced laterally outwardly from said upright wall; crop-collecting means disposed ahead of the feed trough and operative to collect and lift crops to the feed trough as the machine advances; conveyor means carried in the feed trough and operative to move the crops laterally inwardly through the feed opening and into the bale case; means supporting the housing structure on the main frame including trunnion means providing for vertical swinging adjustment of the crop-collecting means relative to the feed trough about a transverse axis; an L-shaped support having a transverse leg and a fore-and-aft leg, said transverse leg extending over and free from the crop-collecting means and having an inner end secured to the bale case, and said fore-and-aft leg extending rearwardly from the transverse leg and laterally outwardly of and free from the crop-collecting means and having a rear end secured to the feed trough; an adjusting lever connected to the crop-collecting means to adjust said crop-collecting means about the axis of said trunnion means, said lever extending upwardly adjacent to the aforesaid fore-and-aft leg; and means releasably cooperative between the lever and said fore-and-aft leg for securing and releasing the lever to respectively fix and adjust the position of the crop-collecting means.

9. An agricultural machine adapted to advance over a field of crops, comprising: a mobile main frame including a fore-and-aft bale case and baling mechanism therein, said bale case having an upright side wall provided with a feed opening; a feed trough carried by the main frame and extending laterally outwardly from and in communication with said feed opening to an outer upright terminal end structure, said feed trough having a transverse top wall provided with a transverse front edge portion and said feed trough further having a transverse floor below said top wall and including a transverse front edge portion spaced below the transverse front edge of the top wall; an open-bottom crop-collector housing structure disposed ahead of the feed trough and having an arched roof formed generally about an axis parallel to the feed trough, said roof having a forward edge spaced above the ground but below the level of the feed trough and a rearward transverse edge spaced above and overlying the front edge of the feed trough to define a crop-transfer opening, said rearward transverse edge being in overlapping relation to the front edge portion of the feed trough top wall, and said housing structure having opposite inner and outer fore-and-aft end walls respectively adjacent to the bale case wall and the feed trough terminal end structure; means supporting the housing structure on the main frame; a crop-collecting rotor carried in the housing for rotation on an axis parallel to and horizontally intermediate the front edges of the feed trough and roof and at a level vertically intermediate said front edges, said rotor having a central shaft and a plurality of flail-like elements connected to and radiating from the shaft, said rotor being rotatable to cause the elements to sweep downwardly through the open bottom of the housing structure and then forwardly to collect crops from the field and then upwardly and rearwardly to lift the collected crops to carry the crops rearwardly beneath the roof and to cause the crops to depart from the rotor rearwardly through the aforesaid crop-transfer opening and onto the feed trough; and conveyor means carried in the feed trough and operative to move the crops laterally inwardly through the feed opening and into the bale case.

10. An agricultural machine adapted to advance over a field of crops, comprising: a mobile main frame including a fore-and-aft bale case and baling mechanism therein, said bale case having an upright side wall provided with a feed opening; a feed trough carried by the main frame and extending laterally outwardly from and in communication with said feed opening, said feed trough having an outer upright terminal end structure spaced laterally outwardly from said upright wall; an open-bottom crop-collector housing structure disposed ahead of the feed trough and having a rear discharge opening leading directly to the trough, a transverse front edge spaced above the ground and ahead of said opening, and a fore-and-aft roof leading from said front edge upwardly and rearwardly to said opening; means supporting the housing structure on the main frame; a crop chopping and collecting rotor journaled beneath the housing on a transverse axis and including a plurality of radial disposed flail-like elements having outer end portions for chopping and collecting crops, the direction of rotation of said rotor being such that when chopping and collecting crops at ground level or thereabove the outer end portions of said elements travel in the same direction as the machine to impel the crops upwardly and rearwardly beneath said roof and through the discharge opening and into the trough; and conveyor means carried in the feed trough and operative to move the crops laterally inwardly through the feed opening and into the bale case.

References Cited in the file of this patent

UNITED STATES PATENTS

| | | |
|---|---|---|
| 2,430,734 | Raney et al. | Nov. 11, 1947 |
| 2,450,082 | Crumb et al. | Sept. 28, 1948 |
| 2,524,233 | Russell | Oct. 3, 1950 |
| 2,556,446 | Roach | June 12, 1951 |